July 26, 1960    N. P. PEET    2,946,754
PRODUCTION OF SYNTHESIS GAS
Filed Nov. 21, 1957
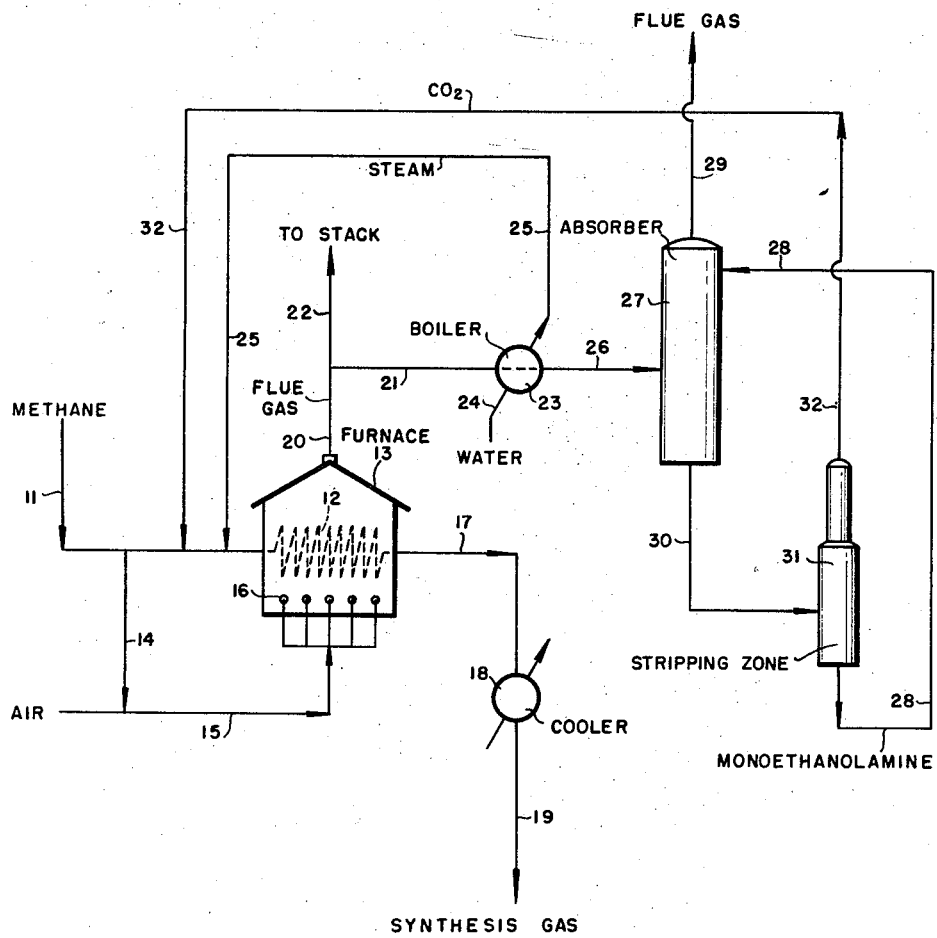
INVENTOR.
NICK P. PEET,
BY
ATTORNEY.

United States Patent Office 2,946,754
Patented July 26, 1960

2,946,754
PRODUCTION OF SYNTHESIS GAS

Nick P. Peet, Baytown, Tex., assignor, by mesne assignments, to Esso Research and Engineering Company, Elizabeth, N. J., a corporation of Delaware Filed Nov. 21, 1957, Ser. No. 697,982

4 Claims. (Cl. 252—373)

The present invention is directed to the production of synthesis gas. More particularly, the invention is concerned with the production of synthesis gas from methane. In its more specific aspects, the invention is concerned with a method of producing synthesis gas for use in the production of methanol or hydrocarbons.

The present invention may be briefly described as a method for producing synthesis gas from methane in which a methane feed stream is divided into a first portion and a second portion. The first portion is contacted in admixture with steam and carbon dioxide obtained in a later step of the invention at an elevated temperature in a conversion zone with a catalyst to produce synthesis gas. The second portion of the methane feed stream is burned in the conversion zone to provide the elevated temperature and to form a combustion gas containing substantial amounts of carbon dioxide. The combustion gas is cooled with water to generate steam and reduce the temperature of the combustion gas. Carbon dioxide is recovered from the cooled combustion gas, and the steam and recovered carbon dioxide are admixed with the first portion.

The synthesis gas comprising carbon monoxide and hydrogen is recovered from the contacted mixture and may then be used in the production of methanol or in the production of hydrocarbons.

The temperature at which the first portion is contacted with the catalyst to produce synthesis gas may suitably range between about 1100° and 1850° F. with satisfactory operations obtained at a temperature of about 1500° F. Pressures for the production of synthesis gas may range from about 0 to about 300 pounds per square inch gauge, with suitable operations conducted at a pressure of about 150 pounds per square inch gauge.

The catalyst employed in the production of the synthesis gas is suitably a nickel catalyst, such as reduced nickel oxide, nickel-thoria-magnesia, nickel-alumina-magnesia, nickel-magnesia, nickel on carbon, or nickel on alumina; other suitable catalysts may include cobalt molybdate supported on alumina, a group VIII metal on metal oxide on a suitable support, nickel and iron on a support or carrier, and the like.

The present invention is suitably conducted to produce a synthesis gas containing approximately two parts of hydrogen and one part of carbon monoxide, with about 50 to about 75 percent of the combustion gas being cooled with water to generate steam and reduce the temperature of the gas.

The present invention will be further illustrated by reference to the drawing in which the single figure is in the form of a flow sheet of a preferred mode.

Referring now to the drawing, numeral 11 designates a charge line by way of which a methane-containing feed stream such as natural gas is introduced into the system from a source, not shown. The methane feed stream is divided into two portions, with one portion being introduced into a conversion zone 12 arranged in a furnace 13, while the second portion is fed by way of line 14 into line 15 for admixture with air for charging to furnace 13 to be burned in burners 16 to raise the temperature of the methane introduced into reaction zone 12, which is in the form of a coil containing a suitable synthesis gas catalyst of the type illustrated. By virtue of the burning or combustion operation in zone 13, a synthesis gas having a composition as shown in Table I may be formed.

TABLE I
Synthesis gas

| | Percent |
|---|---|
| CO | 25.3 |
| $CO_2$ | 5.7 |
| $H_2$ | 67.5 |
| $H_2O$ | 1.3 |
| $CH_4$ | 0.1 |
| $N_2$ | 0.1 |

This synthesis gas is recovered from zone 12 by line 17 and cooled in cooler 18 for introduction as may be desired into a methanol synthesis or a hydrocarbon synthesis operation by way of line 19.

The flue gas issues from zone 13 by way of line 20 with from about 50 to 75 percent of the flue gas being recovered by way of line 21 while the remainder is discharged by way of line 22 into a suitable stack for venting to the atmosphere, the stack not being shown.

The flue gas then passes through a suitable boiler 23 into which water is admitted by way of line 24 for generation of steam which is withdrawn by line 25 and which is recycled to line 11 for charging with the first portion of the methane to reaction zone 12.

The cooled flue gas is then introduced by line 26 into a recovery unit 27 which suitably may be an absorber for carbon dioxide such as a tower with internal baffling equipment or other suitable gas-liquid contacting means such as bell cap trays and the like. Introduced into the top of absorption zone 27 is a suitable absorbent, such as monoethanolamine, by way of line 28, but which may be any of the other suitable absorbents for carbon dioxide.

The unabsorbed flue gas is discharged from absorption zone 27 by line 29, while the enriched solution containing absorbed carbon dioxide is withdrawn from zone 27 by line 30 into a stripping zone 31, where heat is applied to drive the absorbed carbon dioxide from the monoethanolamine. The carbon dioxide is recovered by line 32 and discharged into line 11 to form the feed admixture to the reaction zone 12.

By virtue of an operation such as described in the drawing, the synthesis gas is generated solely from methane and air in a suitable combined furnace-conversion zone.

The operation described in the drawing produces a synthesis gas containing approximately 2 parts of hydrogen to 1 part of carbon monoxide. Approximately ½ to ¾ of the flue gas from the combustion operation is cooled, compressed and processed to extract carbon dioxide which is then used to supply the carbon dioxide requirements for the synthesis gas operation.

EXAMPLE I

A stream of natural gas amounting to 12.2 million cubic feet/day is divided into a first portion of 7.5 million cubic feet/day which is charged to a conversion reactor and a second portion of 4.7 million cubic feet/day which is burned in a furnace providing heat for conversion of the aforementioned first portion. The heat released from combustion of the 4.7 million cubic feet/day portion is in balance with that required for conversion of the 7.5 million cubic feet/day in the reactor.

Natural gas suitable for this operation may have a typical analysis as follows:

| | |
|---|---|
| $CH_4$ | 94.57 mol percent. |
| $C_2H_6$ | 4.14 mol percent. |
| $C_3H_8$ | 0.75 mol percent. |
| $C_4H_{10}$ | 0.04 mol percent. |
| $CO_2$ | 0.30 mol percent. |
| Air | 0.20 mol percent. |
| $H_2S$ | 0.3 part per million by weight. |

A portion of the flue gas from the reactor furnace is passed through a steam generating system from which is produced 800,000 lbs./day of steam. The cooled flue gas from the steam generating plant is passed to a $CO_2$ recovery system from which 2.5 million cubic feet/day of $CO_2$ is recovered from the flue gas.

The total feed gas mixture to the reactor comprises 7.5 million cubic feet/day of natural gas, 2.5 million cubic feet/day of $CO_2$, and 639,000 lbs./day of steam (the steam comprising approximately 80% of that generated by the flue gases cooled for recovery of $CO_2$). This admixture is passed at 1000 v./v./hr. (based on outlet $H_2$+CO) through furnace tubes packed with a nickel catalyst such as the Girdler type G–29 catalyst which contains 27% nickel on a suitable support. The effluent from the reactor at 20 p.s.i.g. and 1550° F., amounting to 38.8 million cubic feet/day comprises a mixture having the following approximate composition:

| | Percent |
|---|---|
| Hydrogen | 58.2 |
| CO | 21.8 |
| $CO_2$ | 4.9 |
| $H_2O$ | 14.9 |

The above mixture is passed through a scrubber-cooler whereupon it is cooled to a temperature of approximately 100° F. A gaseous mixture is recovered from the scrubber-cooler having the following composition:

| | Percent |
|---|---|
| $H_2$ | 67.5 |
| CO | 25.3 |
| $CO_2$ | 5.7 |
| $H_2O$ | 1.3 |

The above mixture, which is at 15 p.s.i.g., is then compressed and may be used for conversion to methanol.

While the invention has been described and illustrated by reference to use of methane as the feed, it will be preferred to employ natural gas as the feed. Natural gas as produced usually comprises a major amount of methane and minor amounts of ethane, propane and butane. Accordingly, it is contemplated that mixtures of these several hydrocarbons having 1 to 4 carbon atoms in the molecule may be used or the hydrocarbons in a substantially purified form may comprise the feed stock.

This application contains subject matter common to that disclosed in Serial No. 697,829, filed November 21, 1957, now U.S. Patent No. 2,904,575, for Nick P. Peet, and entitled Production of Methanol.

The nature and objects of the present invention having been completely described and illustrated, what I wish to claim as new and useful and secure by Letters Patent is:

1. A method for producing synthesis gas which comprises the steps of dividing a natural gas feed stream into a first portion and a second portion, contacting the first portion in admixture with steam and carbon dioxide obtained in a later step at an elevated temperature within the range between about 1100° and 1850° F. and at pressures from about 0 to 300 pounds per square inch gauge in a conversion zone arranged in a combustion zone with a synthesis gas catalyst to produce synthesis gas, burning the second portion in said combustion zone to provide said elevated temperature and to form a combustion gas containing substantial amounts of carbon dioxide, cooling the combustion gas with water to generate steam and reduce the temperature of the combustion gas, recovering carbon dioxide by absorption from the cooled combustion gas, admixing the steam and recovered carbon dioxide with the first portion, and recovering said synthesis gas comprising carbon monoxide and hydrogen from the contacted admixture, said first and second portions being proportioned such that the heat released from burning said second portion is in balance with that required for conversion of said first portion.

2. A method for producing synthesis gas which comprises the steps of dividing a methane-containing feed stream into a first portion and a second portion, contacting the first portion in admixture with steam and carbon dioxide obtained in a later step at an elevated temperature within the range between about 1100° and 1850° F. and at pressures from about 0 to 300 pounds per square inch gauge in a conversion zone arranged in a combustion zone with a nickel catalyst to produce synthesis gas, burning the second portion in said combustion zone to provide said elevated temperature and to form a combustion gas containing substantial amounts of carbon dioxide, cooling the combustion gas with water to generate steam and reduce the temperature of the combustion gas, recovering carbon dioxide by absorption from the cooled combustion gas, admixing the steam and recovered carbon dioxide with the first portion and recovering said synthesis gas comprising carbon monoxide and hydrogen from the contacted admixture, said first and second portions being proportioned such that the heat released from burning said second portion is in balance with that required for conversion of said first portion.

3. A method for producing synthesis gas which comprises the steps of dividing a methane-containing feed stream into a first portion and a second portion, contacting the first portion in admixture with steam and carbon dioxide obtained in a later step at an elevated temperature within the range between about 1100° and 1850° F. and at pressures from about 0 to 300 pounds per square inch gauge in a conversion zone arranged in a combustion zone with a synthesis gas catalyst to produce synthesis gas containing approximately two parts of hydrogen to one part of carbon monoxide, burning the second portion in said combustion zone to provide said elevated temperature and to form a combustion gas containing substantial amounts of carbon dioxide, cooling from about 50 percent to about 75 percent of the combustion gas with water to generate steam and reduce the temperature of the gas, recovering carbon dioxide by absorption from the cooled combustion gas, admixing the steam and recovered carbon dioxide with the first portion and recovering said synthesis gas from the contacted admixture, the heat released from burning said second portion being in balance with that required for conversion of said first portion.

4. A method for producing synthesis gas which comprises the steps of dividing a hydrocarbon feed stream having 1 to 4 carbon atoms in the molecule into a first portion and a second portion, contacting the first portion in admixture with steam and carbon dioxide obtained in a later step at an elevated temperature within the range between about 1100° and 1850° F. and at pressures from about 0 to 300 pounds per square inch gauge in a conversion zone arranged in a combustion zone with a nickel catalyst to produce synthesis gas, burning the second portion in said combustion zone in said conversion zone to provide said elevated temperature and to form a combustion gas containing substantial amounts of carbon dioxide, cooling the combustion gas with water to generate steam and reduce the temperature of the combustion gas, recovering carbon dioxide by absorption from the cooled combustion gas, admixing the steam and recovered carbon dioxide with the first portion, and recovering synthesis gas comprising carbon monoxide and hydrogen from the contacted admixture, said first and second portions being proportioned such that the heat released from burning said second portion is in balance with that required for conversion of said first portion.

References Cited in the file of this patent

UNITED STATES PATENTS

| | | |
|---|---|---|
| 2,185,989 | Roberts | Jan. 2, 1940 |
| 2,234,941 | Keith | Mar. 11, 1941 |
| 2,448,290 | Atwell | Aug. 31, 1948 |
| 2,585,737 | Carpenter | Feb. 12, 1952 |
| 2,676,156 | Bailey | Apr. 20, 1954 |